United States Patent Office 3,042,395
Patented July 3, 1962

---

3,042,395
SPRING ASSEMBLY
George F. Cole, Barston, Hampton-in-Arden, and Alfred Turley, Bushbury, Wolverhampton, England, assignors to Vono Limited, Tipton, England, a British company
Filed June 1, 1960, Ser. No. 33,284
Claims priority, application Great Britain Sept. 9, 1959
3 Claims. (Cl. 267—108)

This invention relates to spring assemblies which are used for the interiors of seats and mattresses and other articles of furniture for seating or reclining upon and which are also used in other seats such as cars, aircraft, vehicles and other means of transportation and therefore the spring assemblies forming the subject of the present invention are capable of use in a wide variety of applications and are not restricted to normal domestic furniture.

The majority of such spring assemblies to-day make use of a number of helical coil springs assembled with their axes in generally parallel relationship and connected together at their ends and covered and upholstered with suitable padding and other materials. The manufacture of such spring assemblies is relatively complex and a considerable amount of metal is used in providing the required number of helical springs.

The object of the present invention is to provide an improved spring assembly having greater comfort value than is obtained with existing spring assemblies comprising a plurality of coil springs assembled together and also a further object is to provide an improved spring assembly containing less metal and therefore of less weight than the known type of spring assembly incorporating coil springs and of the same size.

According to the present invention, we provide a spring assembly comprising a plurality of similar spring units connected together, each unit being made from wire and comprising a pair of arms extending in acute angular relationship from a coil portion formed integrally with the arms so that the arms lie in the same general plane as the coil and are arranged so that movement of the arms towards or away from each other stresses the coil portion tending to restore the arms to their initial position in which the coil portion is unstressed, one arm at least having its free end formed, or adapted to be hingedly connected to an adjacent unit whereby two or more of such units may be connected together in a common plane or in mutually parallel planes, a spring assembly being made from a number of such sub-assemblies of two or more connected units.

In a very simple form of spring assembly according to the invention, the individual units may each be of substantially V-formation with the coil portion formed at the apex of the V.

With this simple form of spring unit, a complete spring assembly may be formed by having a number of lines of such units connected in spaced parallel relationship to form the length and breadth of the assembly, each such line being formed by connecting together a number of the units so that a free end of one V unit is hingedly connected to the apex of the next unit and so on.

The depth of such an assembly is then equal to the vertical from one arm of a V to the opposite free extremity. Such an assembly may be used in cases where no great depth is required (such as in the seat squabs in motor vehicles) or where a great degree of resilience is not called for.

However where greater depth and a greater degree of resilience are required which may not conveniently be obtained with units of simple V-formation, then a spring assembly may be produced according to a further aspect of the invention.

According to this further aspect of the invention, we provide a spring assembly comprising a plurality of similar spring units connected together, each unit being made of wire and comprising a substantially M shaped figure lying on its side in the operative position and the central apex of the figure being formed as a spring coil in the wire which coil is stressed when the two inner arms are moved towards each other, each of the two outer arms having its free end formed, or adapted to be hingedly connected to the corresponding outer arm of an adjacent unit whereby two or more of such units are connected together in a common general plane or in mutually parallel planes and a number of such sub-assemblies of two or more connected units being connected together to form a spring assembly.

For example, a mattress, or seat foundation or cushion may have a spring assembly built-up from a number of lines of such M units, the lines being connected in spaced parallel relationship to make the length and breadth of the assembly and each line being a number of the M units connected hingedly together as described above so that they lie in a common plane.

The spaced lines of units may be connected together by means of wires or rods threaded through the hinge connections between adjacent units on the upper and lower faces of the assembly, or other forms of connecting means may be used as mentioned hereinafter.

For ease of understanding, the rows of spring units in which adjacent units are connected together hingedly will be termed "longitudinal" rows. It will be appreciated that in a spring assembly the units will also lie in "transverse" rows (i.e. extending from side-to-side) and another feature of the invention is to make a transverse row of units from a single length of wire.

According to this feature of the invention a transverse row of units comprising two or more units is made from a single length of wire wherein the free end of an arm of a unit is extended at right angles to the plane of the unit to form an integral connecting portion and join up with the free end of an arm of the next adjacent unit in the transverse row. As will be understood this formation can be continued all along the transverse row so that all the units are integrally connected and can be formed from a single length of wire. This provides a means for an economical mass production of transverse rows of the spring units by means of a machine which can act upon and form a single length of wire into the plurality of connected units.

Further the connecting portion between adjacent units may be of spiral form so that transversely extending wires may be threaded through the spirals to stabilize the assembly and also provide the means for hingedly connecting the units in one transverse row to those in another transverse row.

The invention is illustrated in the accompanying drawings wherein:

FIGURE 1 is a perspective view of a part of a spring assembly in which certain alternative forms of connection have been illustrated.

FIGURE 2 is a side elevation of a part of the assembly.

FIGURE 3 is a perspective view of part of a spring assembly showing the formation of transverse rows of units form a single length of wire.

FIGURE 4 is a plan view which shows diagrammatically the application of the invention to a car seat.

FIGURE 5 is a diagrammatic view showing the invention applied with individual units of V form.

Referring first to FIGURE 2, the individual unit shown there is made from wire so that it is in the form of an M which is lying on its side in the operative position and at the central apex of the M the wire is formed into a coil 10 which may conveniently consist of two full inner coils and two partial outer coils from which extend the July 3, 1962  H. L. COLE  3,042,396
ADJUSTABLE FEEDER SHOE
Filed Sept. 1, 1961  2 Sheets-Sheet 2
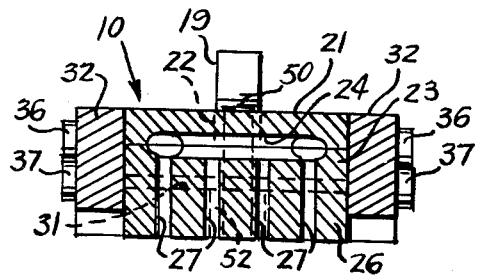
FIG. 7
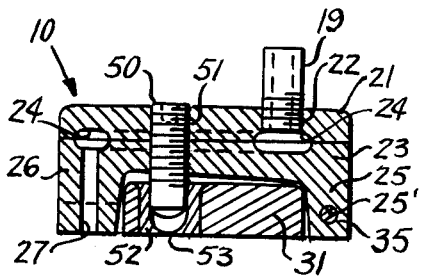
FIG. 6
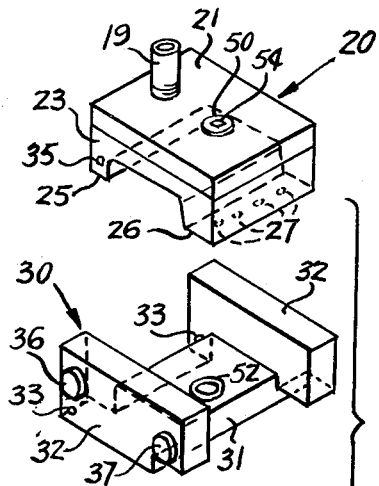
FIG. 8
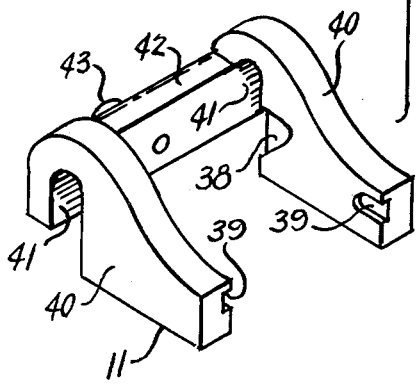
INVENTOR.
HERMAN L. COLE
BY
Kimmel & Crowell
ATTORNEYS.

United States Patent Office 3,042,396
Patented July 3, 1962

3,042,396
ADJUSTABLE FEEDER SHOE
Herman L. Cole, Dallas, Tex., assignor of one-half to Toni Ladymon, doing business as Albert Ladymon Company, Dallas, Tex.
Filed Sept. 1, 1961, Ser. No. 135,477
5 Claims. (Cl. 271—26)

This invention relates to an adjustable feeder shoe or separator foot for vertical presses, and has as its primary object the provision of an improved device for picking up sheets of paper individually from a stack, and swinging them through an arc to deposit the paper in its correct position on the feedboard of the press.

An additional very important object of the invention is the provision of a means in association with such a foot for varying the suction involved so that a single shoe or foot may be employed with a wide variety of weights and grades of paper.

As conducive to a clearer understanding of this invention, it may be pointed out that in presses of this character it is customary to provide a pair of spaced feeder shoes mounted on a swinging arm carried by a frame that pass over a stack of sheets of paper, pick up an individual sheet by suction, and transfer the sheet to operative position on the feedboard of the press.

Heretofore, individual shoes have been provided for various grades and weights of paper, with the suction varying in each individual shoe. This has required constant changing of the shoes with various changes in the type of paper being used, and has required that a multiplicity of shoes be on hand to accommodate the press to various jobs.

An important object of this invention is the provision of a single shoe which may be adjusted to accommodate a variety of types of paper, thus obviating the necessity of a multiplicity of shoes for a variety of jobs.

An additional object of the invention is the provision of a shoe of this character which may be readily placed in and removed from the press feeding apparatus, and which may be adjusted to the grade of paper being used with a minimum of effort and difficulty.

Still another object of the invention is the provision of such a device which is sturdy and durable in construction, reliable and efficient in operation, relatively inexpensive to manufacture, and simple to adjust and utilize.

Still other objects reside in the combinations of elements, arrangements of parts, and features of construction, all as will be more fully pointed out hereinafter and disclosed in the accompanying drawing wherein:

FIGURE 1 is a fragmentary vertical sectional view disclosing the shoe of the instant invention in operative position on a vertical press, only fragments of the latter being shown.

FIGURE 2 is a sectional view taken substantially along the line 2—2 of FIG. 1 as viewed in the direction indicated by the arrows.

FIGURE 3 is an enlarged view partially in elevation and partially in section taken substantially along the line 3—3 of FIG. 2 as viewed in the direction indicated by the arrows.

FIGURE 4 is an enlarged sectional view taken substantially along the line 4—4 of FIG. 2 as viewed in the direction indicated by the arrows.

FIGURE 5 is a sectional view taken substantially along the line 5—5 of FIG. 4 as viewed in the direction indicated by the arrows.

FIGURE 6 is a sectional view taken substantially along the line 6—6 of FIG. 5 as viewed in the direction indicated by the arrows.

FIGURE 7 is a sectional view taken substantially along the line 7—7 of FIG. 5 as viewed in the direction indicated by the arrows; and FIGURE 8 is an exploded perspective view of the component parts of the shoe or foot shown in disassembled position, together with the standard holder therefor, certain concealed parts being indicated in dotted lines.

Similar reference characters refer to similar parts throughout the several views of the drawing.

Having reference now to the drawings in detail, the shoe of the instant invention is generally indicated at 10, and is carried by a standard holder 11 which is mounted on a cross bar 12 of the vertical press. The cross bar 12 is mounted between a pair of arms 13, which are pivotally mounted on links 14 which are in turn pivotally connected as by a pivot 15 between a pair of swinging press arms 16. The arms 16 swing the shoes 10 to a position to pick up an individual sheet of paper P carried by a supporting table T and move the same to a position on the inclined feeder tray F of a conventional vertical press to be printed. Suction is applied to the shoes, of which there are two, through a vacuum pipe 17 and a pair of tubular flexible conduits 18, the latter being suitably connected to bushings 19 carried by the top of each individual shoe 10, and communicating with the interior thereof in a manner to be more fully described hereinafter.

Each shoe comprises an upper portion generally indicated at 20 which includes a top wall 21 which contains an air passage 22.

Top wall 21 is separably secured to a lower top portion 23 which contains a triangular air passage generally indicated at 24 in communication with the inlet 22, and which is provided with a rear leg 25 having a bore 25' therethrough, the purpose of which will be more fully described hereinafter, and a front wall portion 26 having a plurality of air openings 27 therein, which extend downwardly through the bottom surface or face of front wall 27, and which, when suction is applied thereto, serve to pick up the individual sheet of paper P.

A second component of the feeder shoe comprises a lower portion 30, which includes a transverse bar or plate 31 which seats between walls 24 and 26 closely adjacent the underside of portion 23, and which is provided with a pair of end members 32, extending transversely thereacross, and the ends of which extend beyond the sides of the member 31. Aligned bores 33 are provided in the extending ends adjacent rear wall 24, and when aligned with the bore 25', are adapted for the reception of a pivot pin 35, pivotally mounting the two sections on the side opposite the pick up openings 27.

Studs 36 and 37 extend from the outer faces of each end portion 32 and are adapted to engage in recesses 38 and 39, respectively, in the leg portions 40 of holder 11. The leg portions 40 are grooved as at 41 to accommodate the bar 12, and are connected by a transverse member 42 which is provided with a bushing 43 in which extends the shaft 44 of a clamping handle 45, which serves to secure the shoe holders 11 to the L-shaped bar 12, as best shown in FIGS. 1 and 2.

The adjustment of the suction through the openings 27 for various weights and grades of paper is effected by varying the relative position of transverse member 31 to the lower edge of front wall portion 26, to vary the effective distance of the mouths or openings of suction tubes 27 from the sheet of paper P to be acted upon. This is accomplished by means of a set screw 50 which engages in a threaded bore 51 which extends through top wall 21 and lower top portion 23 into a recess 52 in transverse member 31. The end of the set screw is countersunk and peened as at 53 so that rotation thereof effectively varies the spacing between member 31 and the lower portion of member 23, and consequently the effective distance of the mouths of openings 27 from the paper. Screw 50 is provided with a top opening 54 which may serve to accommodate an Allen head wrench, or may be slotted or otherwise arranged for effective rotative movement. If desired, a manual operating knob may be positioned on top of the screw, although a recess for the accommodation of a tool has been found more effective.

From the foregoing it will now be seen that there is herein provided an adjustable feeder shoe or separator foot particularly adapted for vertical presses, such for example, as the so-called Miehle press, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In a feeder shoe for presses, the combination of an upper portion including a top wall, a depending front wall having a bottom, and a depending rear wall, said top wall having an air passage therethrough adapted to be connected to a source of suction, said front wall having portions defining a plurality of spaced pick up air passages therein opening through the bottom of said front wall and communicating with said first-mentioned air passage, and a lower portion comprising a transverse member extending between said front and rear walls and side wall portions extending upwardly on opposite sides of said top wall, the bottom of said transverse member being normally aligned with said bottom of said front wall, and means for varying the relative position of said transverse member to said bottom of said front wall to vary the effective distance of the openings therein from the paper to be picked up to accommodate various grades of paper.

2. In a feeder shoe for presses, the combination of an upper portion including a top wall, a depending front wall having a bottom, and a depending rear wall, said top wall having an air passage therethrough adapted to be connected to a source of suction, said front wall having portions defining a plurality of spaced pick up air passages therein opening through the bottom of said front wall and communicating with said first-mentioned air passage, and a lower portion comprising a transverse member extending between said front and rear walls and side wall portions extending upwardly on opposite sides of said top wall, the bottom of said transverse member being normally aligned with said bottom of said front wall, and means for varying the relative position of the bottom of said transverse member to said bottom of said front wall to vary the effective distance of the openings therein from the paper to be picked up to accommodate various grades of paper, said means comprising an adjusting screw extending through a threaded bore in said top wall and having its lower end rotatably secured in said transverse member.

3. In a feeder shoe for presses, the combination of an upper portion including a top wall, a depending front wall having a bottom, and a depending rear wall, said top wall having an air passage therethrough adapted to be connected to a source of suction, said front wall having portions defining a plurality of spaced pick up air passages therein opening through the bottom of said front wall and communicating with said first-mentioned air passage, and a lower portion comprising a transverse member extending between said front and rear walls and side wall portions extending upwardly on opposite sides of said top wall, the bottom of said transverse member being normally aligned with said bottom of said front wall, and means for varying the relative position of the bottom of said transverse member to said bottom of said front wall to vary the effective distance of the openings therein from the paper to be picked up to accommodate various grades of paper, said means comprising an adjusting screw extending through a threaded bore in said top wall and having its lower end rotatably secured in said transverse member, said upper portion being comprised of two members separable along a horizontal plane to provide access to said air passages.

4. In a feeder shoe for presses, the combination of an upper portion including a top wall, a depending front wall having a bottom, and a depending rear wall, said top wall having an air passage therethrough adapted to be connected to a source of suction, said front wall having portions defining a plurality of spaced pick up air passages therein opening through the bottom of said front wall and communicating with said first-mentioned air passage, and a lower portion comprising a transverse member extending between said front and rear walls and side wall portions extending upwardly on opposite sides of said top wall, the bottom of said transverse member being normally aligned with said bottom of said front wall, and means for varying the relative position of the bottom of said transverse member to said bottom of said front wall to vary the effective distance of the openings therein from the paper to be picked up to accommodate various grades of paper, said means comprising an adjusting screw extending through a threaded bore in said top wall and having its lower end rotatably secured in said transverse member, said lower portion being pivotally connected to said rear wall of said upper portion of the feeder shoe.

5. A feeder shoe for presses comprising in combination an upper portion including a top wall, a lower top portion fixed to said top wall and having spaced depending front and rear wall portions, said top wall and said lower top portion each having confronting complementary portions defining an air passage therethrough adapted to be connected to a source of suction, the front wall of said lower top portion having portions defining pickup air passages therein opening through the bottom of said front wall and in communication with said first-mentioned air passage, a lower portion hingedly connected to said lower top portion and comprising a transverse member extending between said spaced front and rear walls, said lower portion including side walls extending upwardly on opposite sides of the top wall of said upper portion, the bottom of said transverse member being normally aligned with the bottom of said front wall, portions of said top wall defining a threaded bore therethrough, a threaded adjusting screw extending through said threaded bore in the top wall and having its lower end retainably secured in said transverse member of said lower portion whereby rotation of said adjusting screw will vary the relative position of the bottom of said transverse member to the bottom of said front wall to vary the effective distance of the openings in said front wall from the paper to be picked up whereby various grades and weights of paper can be accommodated.

References Cited in the file of this patent

UNITED STATES PATENTS 1,694,719 Plum et al. _____ Dec. 11, 1928